(12) United States Patent
Chen et al.

(10) Patent No.: US 8,015,548 B2
(45) Date of Patent: Sep. 6, 2011

(54) METHOD FOR OBTAINING CONTEXT OF CORRESPONDING XLET WHILE PLAYING BD-J TITLE

(75) Inventors: Tian-Jin Chen, Hangzhou (CN); Wei Li, Hangzhou (CN); Fang Ji, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 1167 days.

(21) Appl. No.: 11/723,765

(22) Filed: Mar. 22, 2007

(65) Prior Publication Data
US 2008/0235662 A1 Sep. 25, 2008

(51) Int. Cl.
*G06F 9/44* (2006.01)
(52) U.S. Cl. ........ 717/118; 717/106; 717/108; 717/114; 717/116; 717/117
(58) Field of Classification Search ............ None
See application file for complete search history.

(56) References Cited

U.S. PATENT DOCUMENTS

| | | | |
|---|---|---|---|
| 7,367,025 B1* | 4/2008 | Nikolov et al. | 717/158 |
| 7,475,214 B2* | 1/2009 | Hwang | 711/170 |
| 7,515,812 B2* | 4/2009 | Ikeda et al. | 386/241 |
| 7,565,062 B2* | 7/2009 | Iwamoto et al. | 386/240 |
| 7,616,864 B2* | 11/2009 | Tanaka et al. | 386/239 |
| 2006/0070044 A1* | 3/2006 | Romanovski et al. | 717/136 |
| 2006/0140091 A1* | 6/2006 | Iwamoto et al. | 369/53.2 |
| 2007/0038989 A1* | 2/2007 | Newton et al. | 717/166 |
| 2007/0253679 A1* | 11/2007 | Tanaka et al. | 386/95 |
| 2007/0286575 A1* | 12/2007 | Oashi et al. | 386/95 |
| 2008/0292270 A1* | 11/2008 | Ikeda | 386/95 |
| 2009/0060476 A1* | 3/2009 | Iwamoto et al. | 386/126 |

OTHER PUBLICATIONS

Title: Xlet-based, IESG(Integrated Electronic Service Guide) in ATSC-ACAP, author: Hoyeon Jang et al, source: IEEE, dated: Aug. 9, 2006.*
Title: Exploiting Java instruction/thread level parallelism with horizontal multithreading, author: Watanabe, K, dated: /29/2001, source: IEEE.*

* cited by examiner

*Primary Examiner* — Chameli Das
(74) *Attorney, Agent, or Firm* — Bacon & Thomas, PLLC (57) ABSTRACT

The present invention is to provide a method for enabling Blue-ray Disc Java (BD-J) to effectively obtain context of a corresponding application, namely an Xlet, while playing BD-J title, which comprises the steps of setting up source file attribute of each class by adding an Xlet context ID as an unique code to the class when loading all classes into a cache of the BD-J; looking up back onto a call stack to search for Xlet class of the current BD-J title when searching for Xlet context; and then obtaining the Xlet context through the Xlet context ID according to the source file attribute. Thus, the method of the present invention enables BD-J to normally play the BD-J title in the Blue-ray Disc Read Only Memory (BD-ROM) and, at the same time, effectively improves the playing performance.

3 Claims, 6 Drawing Sheets

METHOD FOR OBTAINING CONTEXT OF CORRESPONDING XLET WHILE PLAYING BD-J TITLE

FIELD OF THE INVENTION

The present invention relates to Blue-ray Disc Java (BD-J), which is a Java-based software that will be included in Blue-ray Disc Read Only Memory (BD-ROM) discs and all Blu-Ray Disc players for providing the Blu-ray menus and many other features, more particularly to a method for enabling BD-J to effectively obtain context of a corresponding application, namely an Xlet, while playing BD-J Title.

PRIOR ART OF THE INVENTION

BD-ROM (also called "Blu-ray Disc") is an optical disc format developed by SONY, which is derived from the blue-violet laser used to read and write this type of disc. Because of shorter wavelength (405 nm) of the blue-violet laser, substantially more data can be stored on a BD-ROM than on a common DVD format, which uses a red laser with wavelength 650 nm. In comparison to HD DVD, which also uses a blue laser, BD-ROM has more information capacity per layer (currently 25 GB, but test media is up to 33 GB). Therefore, BD-ROM is deemed to be the next generation of high quality video disc standard.

There are two kinds of titles in BD-ROM, i.e. HDMV Title and BD-J Title, wherein BD-J Title is an essential element in BD-ROM for providing an application programming environment that supports Blu-ray systems and allows Content Providers to deliver highly-interactive and highly-programmable titles to end users. BD-J is based on the Personal Basis Profile (PBP) of the CDC Configuration of Java ME, and earlier on the JavaTV specifications. A BD-J application is a Javan Xlet which is controlled by the BD-ROM player's Application Manager through its Xlet interface. Just like in many other Java ME environments, the Xlet interface has several states, such as the loaded, paused, active and destroyed states. Once an Xlet is destroyed, any resources allocated to it, such as memory and AV control, are released.

A Javan Xlet is registered in the Application Management Table (AMT). Each BD-J Title on a disc can have an associated AMT. At least one application in the AMT must be signaled as "autostart". This application will be started when the corresponding Title is selected and from thereon the BD-J platform is used by the BD-J application. This could include selecting another Title and launching other applications signaled in the AMT or downloading from the Internet.

In general, the conventional model for Java applications doesn't work very well in a digital TV environment. The basic Java application model assumes that only one application is executing in a given virtual machine (VM), and that the application itself is in complete control of its lifecycle (which can include killing the Java VM that it's running in). This is less than ideal for a digital TV receiver, where several applications may be running at the same time, and where there is a need to enforce some separation between the applications. Luckily, Xlet introduced by Sun in the JavaTV specification and adopted as the Java application format for MHP (Multimedia Home Platform) and related digital TV standards gives us something pretty close to what we need. Like applet, the Xlet interface allows an external source (the application manager in the case of a digital TV receiver) to start and stop an application, as well as controlling it in other ways. The Xlet interface is found in the following javax.tv.Xlet package as:

```
public interface Xlet {
    public void initXlet(XletContext ctx)
        throws XletStateChangeException;
    public void startXlet( )
        throws XletStateChangeException;
    public void pauseXlet( );
    public void destroyXlet(boolean unconditional)
        throws XletStateChangeException;
}
```

Figure 1:
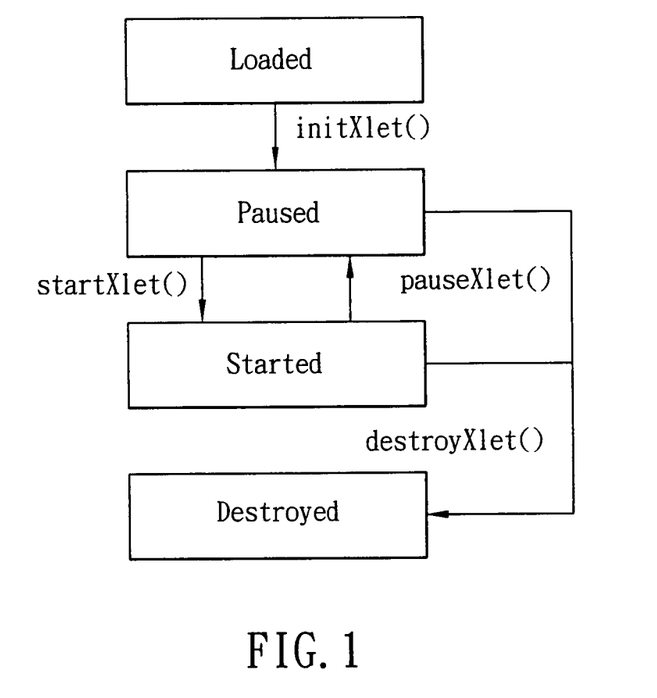
FIG. 1 is a schematic view of the lifecycle of Xlet.

Obviously, the Xlet has methods that allow the application manager to not only initialize, start and stop it, but also pause and resume it. The reason for having the Xlet paused and resumed is very simple—in an environment like a digital TV receiver several applications may be running at the same time, hardware restrictions mean that only one of those applications may be visible at any time. In this scenario, non-visible applications must be paused in order to keep resources free for the application which is visible. Therefore, an Xlet interface has four main states, i.e. Loaded, Paused, Started and Destroyed states, of which the lifecycle of Xlet shown on FIG. 1 is detailedly described as follows:

(1) The application manager loads the Xlet's main class file (as signaled by the broadcaster) and creates an instance of the Xlet by calling the default constructor. This can happen at any point after the application is signaled. Once this has happened, the Xlet is in the Loaded state.

(2) When the user chooses to start the Xlet (or the AIT or other application signaling indicates that the Xlet should start automatically), the application manager in the receiver calls the initXlet( ) method, passing in a new XletContext object for the Xlet. The Xlet may use this XletContext to initialize itself, and to preload any large assets such as images that may require some time to load from the object carousel. When the initialization is complete, the Xlet is in the Paused state and is ready to start immediately.

(3) Once the initXlet( ) method returns, the application manager calls the startXlet( ) method. This will move the Xlet from the Paused state into the Started state, and the Xlet will be able to interact with the user.

(4) During the execution of the Xlet, the application manager may call the pauseXlet( ) method. This will cause the application to move from the Started state back to the Paused state. The application will later be moved back to the Started state by calling the startXlet( ) method again. This may happen several times during the Xlet's life.

(5) At the end of the Xlet's life, the application manager will call the destroyXlet( ) method, which will cause the Xlet to move into the Destroyed state and free all its resources. After this point, this instance of the Xlet cannot be started again.

It's important to remember that an Xlet is not a standard Java application. There are many important differences between the two. An Xlet is conceptually much closer to an applet. Like an applet, there may be more than one Xlet running at any one time, which means that Xlets should not take certain actions that will globally affect the Java virtual machine. For instance, an Xlet should never, ever call the System.exit( ) method because it may not be the only application running in the VM at the time.

Besides, each Xlet has a context associated with it, an instance of the javax.tv.Xlet.XletContext class is shown below, which is used to provide a way for the application to get more information about its environment and to communicate any changes in its state to its environment:

```
public interface XletContext {
    public static final String ARGS = "javax.tv.Xlet.args"
    public void notifyDestroyed( );
    public void notifyPaused( );
    public void resumeRequest( );
        public Object getXletProperty(String key);
}
```

, wherein the notifyDestroyed( ) and notifyPaused( ) methods allow an Xlet to notify the receiver that it is about to terminate or pause itself. The Xlet can use these to make sure that the receiver knows the state of every application and can take appropriate action. These methods should be called immediately before the Xlet enters the Paused or Destroyed states, because the receiver may take action that the application is otherwise unprepared for.

An application can request that it be moved from the Paused state back to the Started state using the resumeRequest( ). This may happen when a given event has occurred, for instance a certain time is reached or a certain event is detected in the MPEG stream. This effectively allows an application to "sleep" for a while. Having said that, this method does only request that an application is started again—the receiver software may choose to ignore this request due to resource limitations, display issues or simply because it's feeling cruel.

Figure 2:
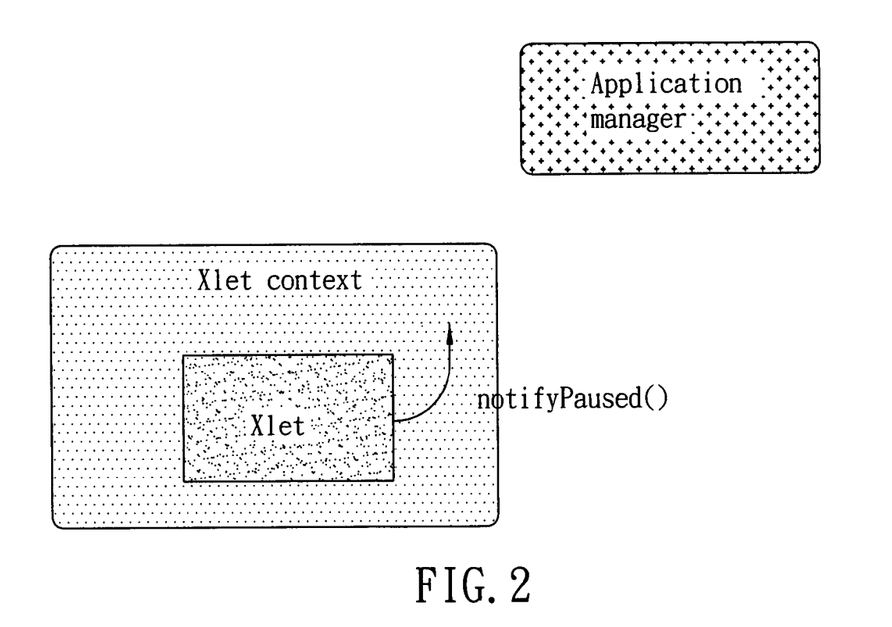
FIG. 2 is a schematic view of notifying its Xlet context that it has paused.
Figure 3:
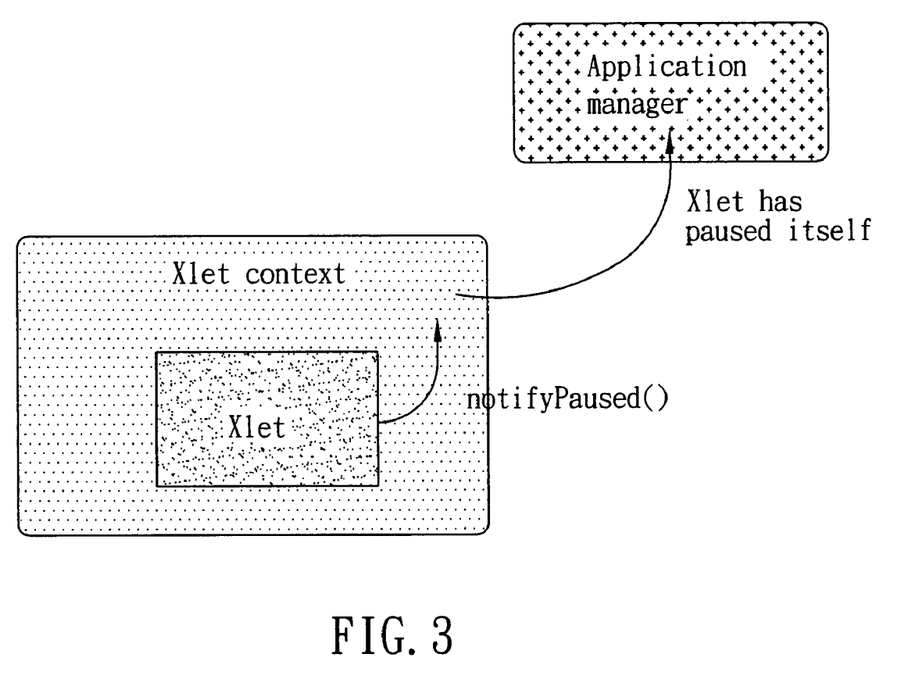
FIG. 3 is a schematic view of passing the information that the Xlet has paused on to the application manager.
Figure 4:
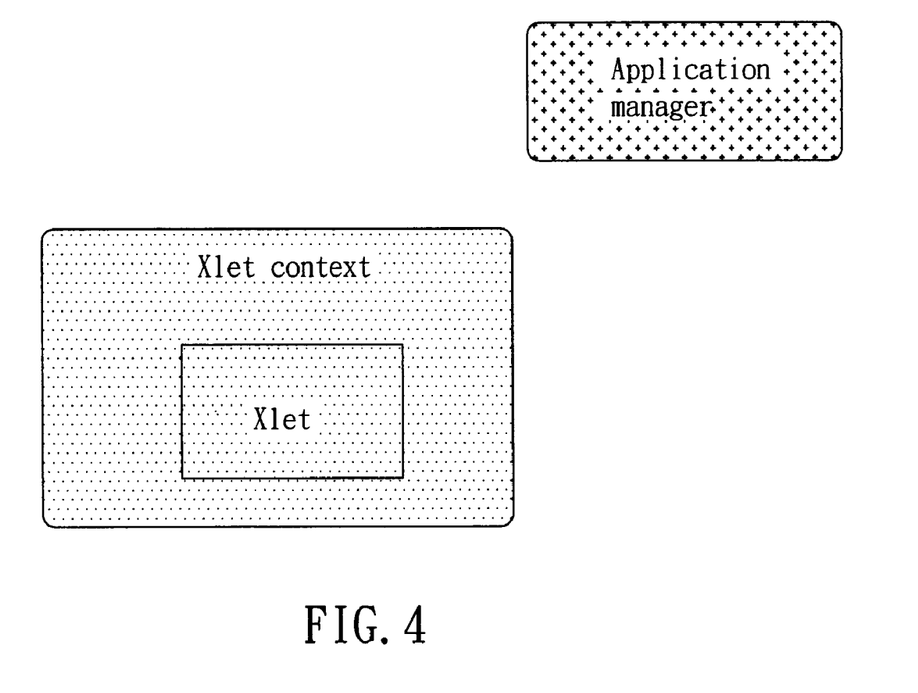
FIG. 4 is a schematic view of the application manager for updating its internal state to reflect that the application has paused and the Xlet goes to sleep.
Figure 5:
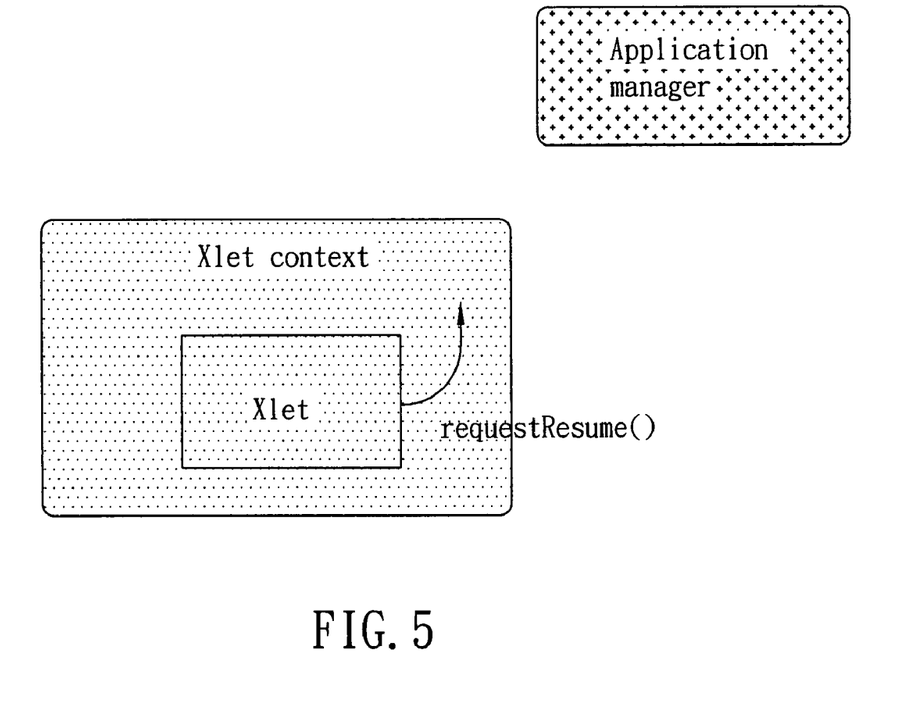
FIG. 5 is a schematic view of the application manager for resuming the operation.
Figure 6:
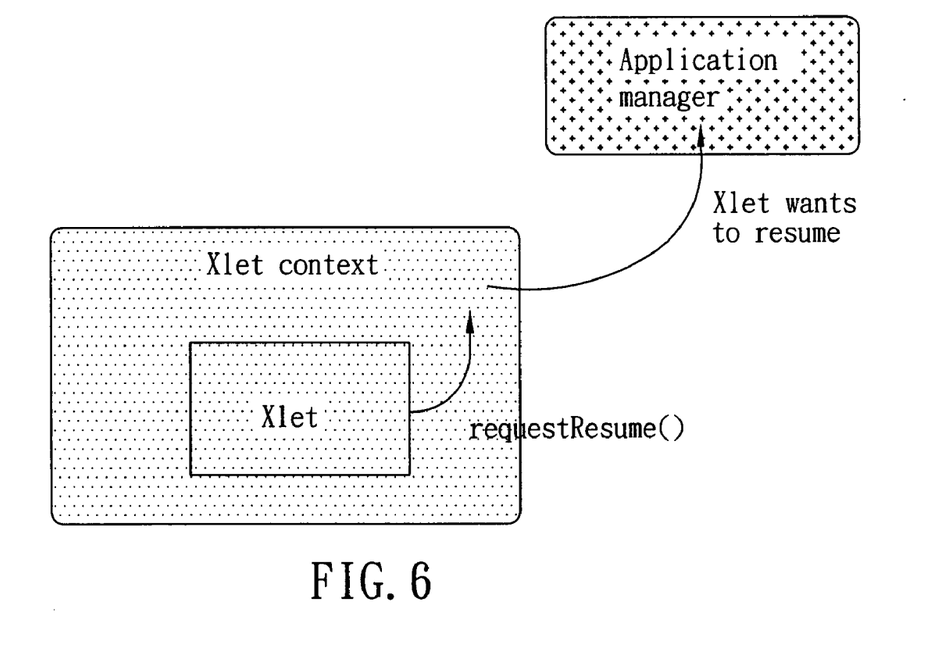
FIG. 6 is a schematic view of the Xlet context for passing the request to the application manager as before.
Figure 7:
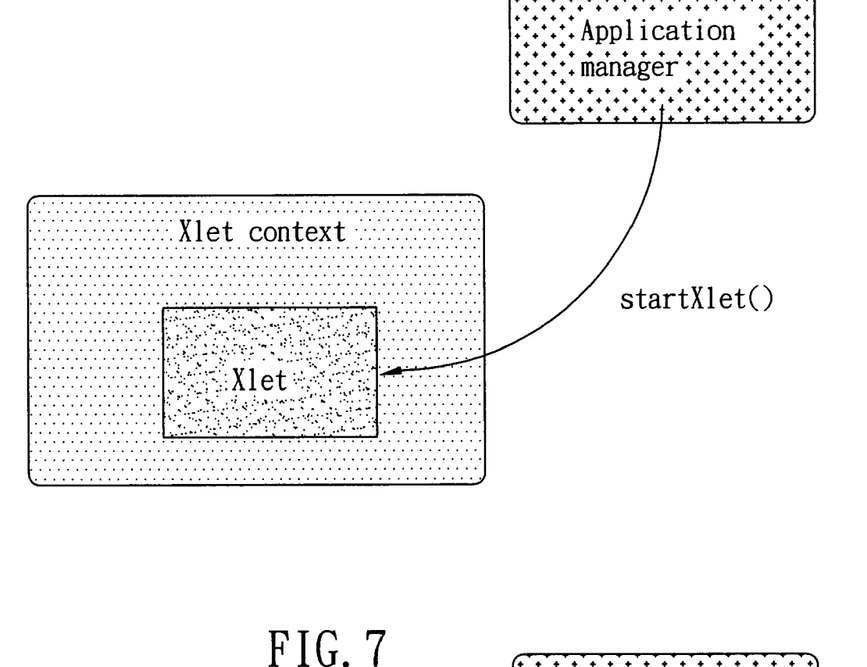
FIG. 7 is a schematic view of the application manager for deciding whether to restart the application or not.
Figure 8:
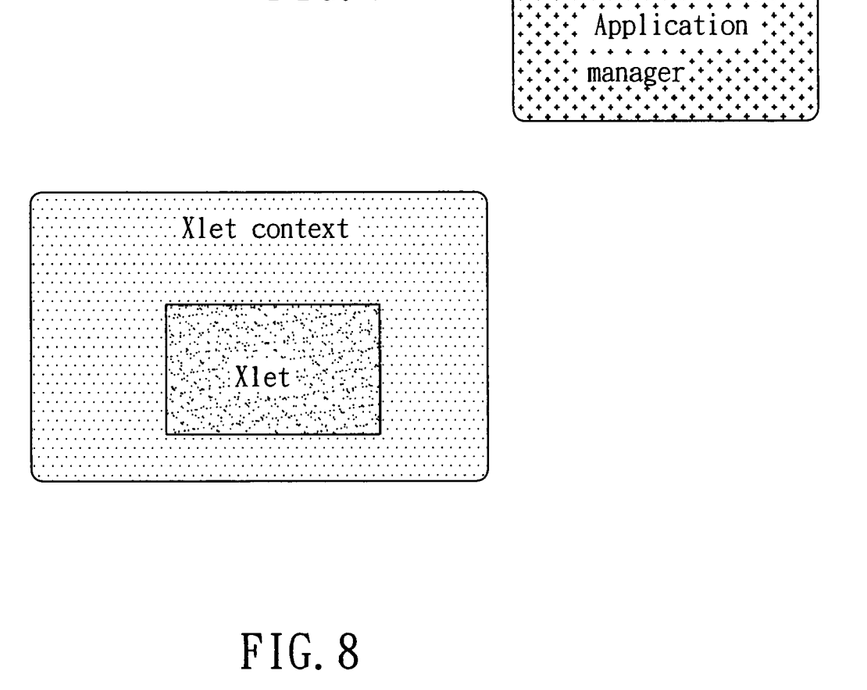
FIG. 8 is a schematic view of the Xlet for resuming the operation.

Referring to FIGS. 2~8, they show exactly what happens when an Xlet requests a change of state via its Xlet context. In this case, the Xlet will pause itself and then requests to resume as follows:

(1) First, referring to FIG. 2, the Xlet notifies its Xlet context that it has paused, by calling the XletContext.notifyPaused( ) method;
(2) Referring to FIG. 3, the Xlet context then passes this information, that the Xlet has paused, on to the application manager in the middleware;
(3) Referring to FIG. 4, the application manager then updates its internal state to reflect that the application has paused, and the Xlet goes to sleep;
(4) Referring to FIG. 5, when the application wants to resume operation (e.g. because a certain time has been reached, or because the user has pressed a key), the Xlet calls the XletContext.requestResume( ) method;
(5) Referring to FIG. 6, the Xlet context passes the request to the application manager as before;
(6) Referring to FIG. 7, the application manager will then decide whether to restart the application or not. If yes, then the application manager will update its internal state to reflect this change and then call the startXlet( ) method on the Xlet. Like all other operations that control the lifecycle of the Xlet, this method is called directly from the application manager and does not go via the Xlet context; and
(7) Referring to FIG. 8, the Xlet will then resume operation.

During the development of a BD-J Title Player, it is found very difficult to obtain the information (such as AppID and Base directory etc.) of Xlet Context while playing the BD-J Title under the following reasons:

1) There are usually a plurality of Xlets being run and communicating with each other simultaneously while the BD-J Title is playing:
   While the BD-J Title is playing, one Xlet is allowed to control the life circles of other Xlets, for instance one Xlet is allowed to pause the running of other Xlets by calling Application Discovery and Launching APIs (hereinafter abbreviated as API) provided in the running environment, acquire AppProxy of the other Xlets through designating the corresponding Xlet ID respectively, and then call the interface corresponding to the AppProxy to modify the running statuses of the other Xlets. In addition to the control of life circle, Xlet is also capable of calling interface resources opened by the other Xlets through a method like Remote Method Invocation (hereinafter abbreviated as RMI) provided in the running environment. However, the above calling processes are completed in local apparatus, but not through network. Though the Xlets are able to communicate with each other, the running of each Xlets is still based on the same running system and the function module of the running system should have the ability to accurately distinguish one Xlet from the others in order to accurately identify which Xlet is the one calling the other Xlets.

2) The disadvantage of utilizing the operation of Thread Group in the current method to acquire Context of Xlet:
   A Thread Group represents a group of Threads, and may also include other Thread Groups. Therefore, every Thread Group has its own Parent Thread Group, and is allowed to visit its own Parent Thread Group and acquire the information thereof. However, one Thread Group is not allowed to visit and acquire the information of other Thread Groups included therein or their Parent Thread Groups. In the current method for identifying Xlet and acquiring the Xlet Context, every Xlet should creat a Thread group and save the corresponding Xlet Context to the Thread group. When the Xlet intends to call a specific interface in the running system, the Xlet has to obtain the Xlet Context (such as AppID and Base directory etc.) corresponding to the specific interface via looping back to the Thread group of current Thread for acquiring the Xlet Context of the current caller, which causes the following problems:
   a) There is existing a leak if a Thread activated by an Xlet does not join in its own Thread group, it is impossible for the Xlet to obtain the corresponding Xlet Context.
   b) Every Xlet needs to create a Thread for processing the events, such as HAVi and Playback etc., and add the Thread into its own Thread group in order to avoid from being unable to acquire the Xlet context, which will badly affect the performance of the system.

Since the BD-J Title comprises high resolution AV stream and Xlet interface for implementing the interactive application while playing the BD-ROM, wherein the BD-J Title includes a variety of Xlets for different application purposes respectively and the environment of running the BD-J Title allows a plurality of Xlets to be executed simultaneously and to communicate with each other, so as to create a powerful interactive environment for the user. However, executing a plurality of Xlets simultaneously will eventually cause the following problems:

1) Since the Xlets created are based on the same MHP (Multimedia Home Platform, hereinafter abbreviated as MHP) API (Application Programming Interface, hereinafter abbreviated as API), it is very difficult for the API to accurately distinguish a specific Xlet from the other Xlets in order to acquire the corresponding context;
2) Allowing a plurality of Xlets to be executed simultaneously while playing high resolution AV stream will consume lots of sources of CPU performance and memory space and cause performance problem.

In order to effectively resolve the above problems, the ideal platform for playing the BD-ROM should have lesser quantity of Thread and occupy lesser resources of the CPU and memory than the conventional platform. Otherwise, it is almost impossible for the user to have a platform for enjoying a smooth and fluent high resolution AV stream from the BD-ROM and the interactive environment thereof.

SUMMARY OF THE INVENTION

In view of the foregoing shortcomings of the prior art, the inventor of the present invention based on years of experience to conduct extensive researches and experiments and finally invented a method for enabling BD-J to effectively obtain corresponding context of an xlet while playing the BD-J Title.

A primary objective of the present invention is to provide a method for enabling BD-J to effectively obtain context of the corresponding Xlet while playing BD-J title, which comprises the steps of retaining stack information in each thread while creating the thread, setting up source file attribute of each class by adding an Xlet Context ID as an unique code of the class when loading all classes into a cache of BD-J Title; looking up back onto a call stack to search for Xlet class of the current BD-J Title when searching for Xlet context; and then obtaining Xlet context through the Xlet context ID according to the source file attribute. Thus, the method of the present invention enables BD-J to normally play the BD-J title in the BD-ROM and, at the same time, effectively improves the playing performance.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

In general, a BD-J application is a set of BD-J classes that operate together and need to be signaled as a single instance to the application manager so that it is aware of its existence and can control its lifetime through a lifecycle interface. When a BD-J Title associated with a BD-J Object in the Index Table on a BD-ROM disc is selected, the corresponding BD-J application is automatically launched and its lifecycle is bound to the BD-J Title. A BD-J application is a Javan Xlet which is controlled by the BD-ROM player's Application Manager through BD-J Application Interface (API). The BD-J Application Interface is also called Xlet interface which, as mentioned above, has four states, i.e. loaded, paused, active and destroyed. Once an Xlet is destroyed, any resources allocated to it, such as memory and AV control, shall be released.

Figure 9:
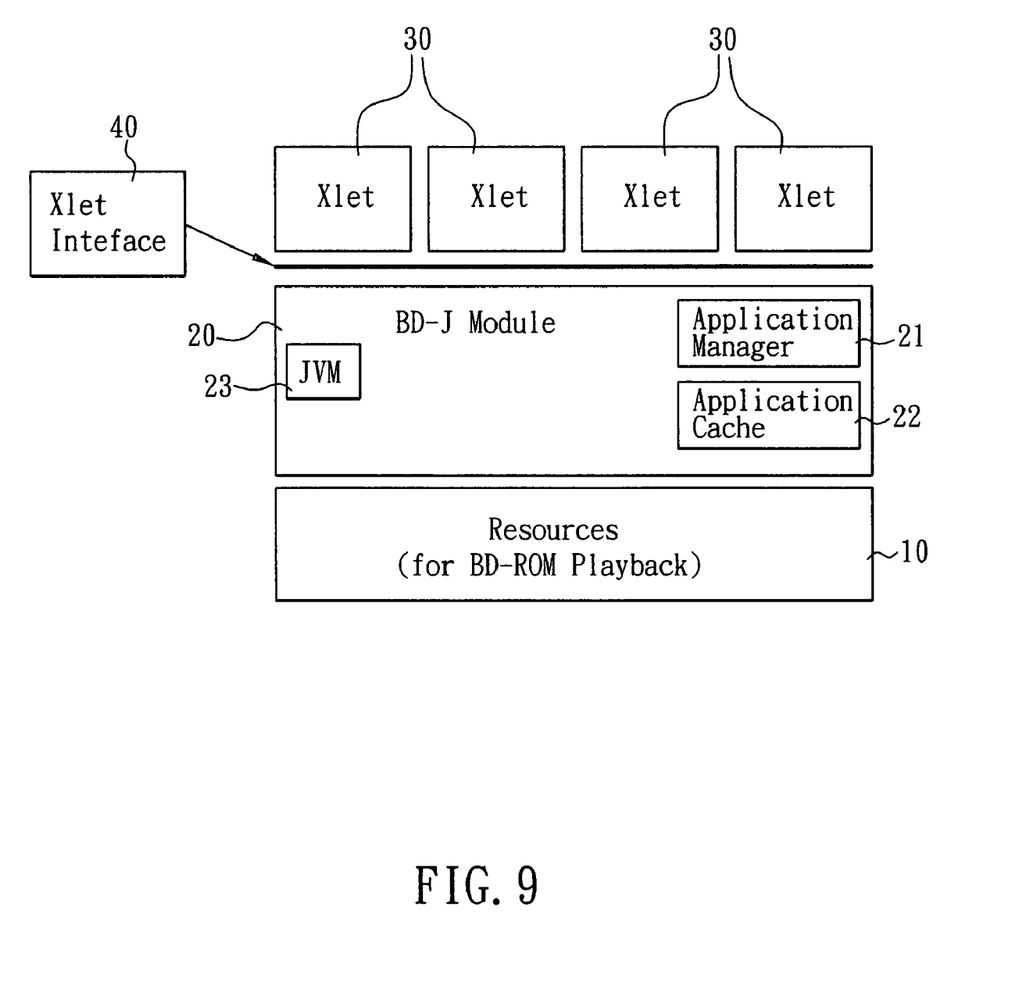
FIG. 9 is a schematic view of the architecture of BD-J software elements.

Referring to FIG. 9, which illustrates an architecture for describing how the BD-J software elements are organized, the BD-J architecture consists of the following three layers:

1) Resources 10, which are the hardware entities in the platform including a number of functions. Hardware or software resources represent these functions. There is no assumption about how they are grouped. There can be more than one hardware entity in the total platform. From an abstract point of view, it makes no difference if the logical resources are mapped into one or several hardware entities. What is important is that resources are provided to BD-J transparently. An application should be able to access all resources as if they were elements of a single entity.

2) BD-J Module 20, which consists of a BD-J specific system software in a BD-ROM system. The BD-J specific system software brings an abstract view of the resources 10. This middle layer isolates the Xlets 30 (i.e. the BD-J applications) from the hardware of the resources 10, enabling portability of the Xlets 30. The system software includes an application manager 21 and an application cache 22, wherein the application manager 21 is used to provide application management functions and is responsible for managing the lifecycle of all Xlets 30, and the application cache 22 is used to load the Xlets 30 for the application manager 21 and is a preload buffer for BD-J which is read-only. The purpose of the application cache 22 is to guarantee seamless playback of AV material from the BD-ROM disc during loading Xlets 30 and to reduce latency in loading data.

3) Xlets 30, which will not directly address the resources 10, and is able to use additional data, including class files, that is not preloaded.

The Xlet interface 40 (i.e. BD-J API) lies between the Xlets 30 and the BD-J Module 20. The Xlets 30 use the Xlet interface 40 to access the actual resources 10 of the BD-J system, including BD-ROM file-system, BD-ROM media decoders, static content decoders, storage devices and a network connection etc. These resources 10 are functional entities of the BD-J system and may be finally mapped onto the hardware of the BD-J system in some manner.

Figure 10:
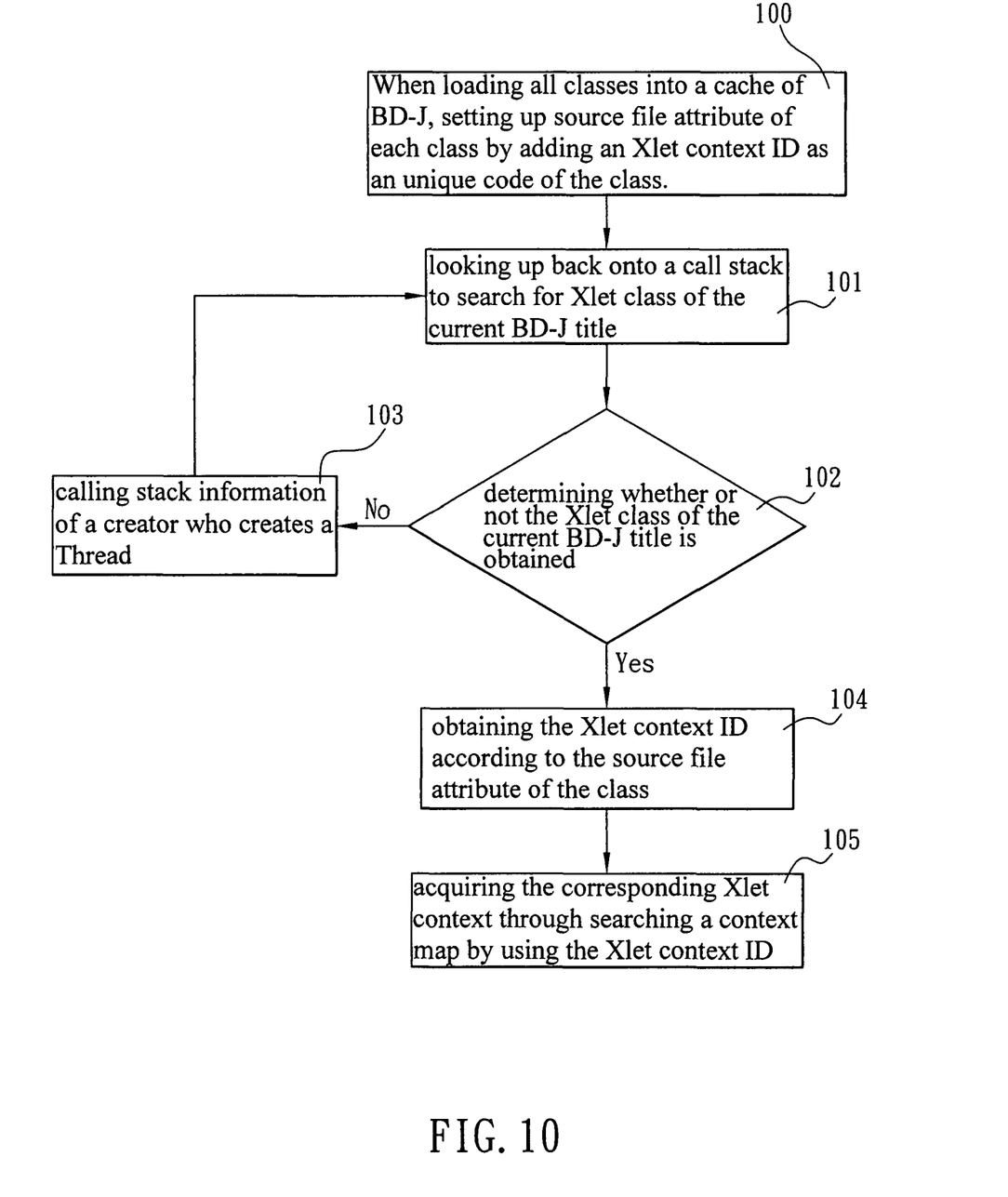
FIG. 10 is a schematic view of the flow chart of the present invention.

Under the conventional mode, when an Xlet creates a Thread by using a new Thread (Runnable) method, since only call stack of the current Tread can be viewed from the stack of Java virtual machine 23 (JVM), the Xlet is unable to search and obtain the corresponding Xlet class through the stack. In order to solve the above drawback, this invention adjusts and amends the implementation of the Thread by retaining the stack information in each Thread while creating the Thread, and then provide an innovative method enabling BD-J to effectively obtain context of a corresponding Xlet while playing BD-J Title, of which a preferred embodiment comprising the following steps is illustrated in FIG. 10:

(100) When the application cache 10 loads all classes of the Xlet 30 that the current playing BD-J title needs into a cache of BD-J, setting up source file attribute of each class by adding an Xlet context ID, such as "cache:\\Xlet context ID", as an unique code of the class.

(101) when searching for Xlet context, looking up back onto a call stack to search for Xlet class of the current BD-J title, wherein the call stack is a special stack which stores information about active subroutines of the running BD-J object. The active subroutines are those which have been called, but have not yet completely executed. The call stack comprises stack frames each including a call corresponding to a subroutine which has not yet been terminated and encapsulates the data such as context information (e.g. class name of the subroutine), variables and return address etc.

(102) determining whether or not the Xlet class of the current BD-J title is obtained; if yes, going to step (104); otherwise, going to step (103);

(103) calling stack information of a creator who creates a Thread and then looping back to step (101);

(104) obtaining the Xlet context ID according to the source file attribute of the class; and (105) then acquiring the corresponding Xlet context through searching a context map by using the Xlet context ID.

Summing up the above, the present invention provides the method enables BD-J to normally play the BD-J title in the BD-ROM and, at the same time, effectively improves the playing performance.

While the invention herein disclosed has been described by means of specific embodiments, numerous modifications and variations could be made thereto by those skilled in the art without departing from the scope and spirit of the invention set forth in the claims.

What is claimed is:

1. A method for obtaining context of corresponding Xlet while playing Blue-ray Disc Java (BD-J) title comprises the steps of:

when loading all classes of an application, namely Xlet, that the current playing BD-J title needs into a cache of BD-J, setting up source file attribute of each class by adding an Xlet context identification (ID) as an unique code of the class;

when searching for Xlet context, looking up a call stack to search for Xlet class of the current BD-J title;

determining whether or not the Xlet class of the current BD-J title is obtained;

when it is determined that the Xlet class of the current BD-J title is not obtained, calling stack information of a creator who creates a Thread and then looping back to look up the call stack to search for the Xlet class of the current BD-J title; and when it is determined that the Xlet class of the current BD-J title is obtained, obtaining the Xlet context ID according to the source file attribute and then acquiring the corresponding Xlet context through searching a context map by using the Xlet context ID.

2. The method as claimed in the claim 1, wherein the call stack stores information about active subroutines of the running BD-J object, and the active subroutines are those which have been called, but have not yet completely executed.

3. The method as claimed in the claim 2, wherein the call stack comprises stack frames each including a call corresponding to a subroutine which has not yet been terminated and encapsulates the data including context information, variables and return address.

* * * * *